United States Patent
Vaibhav et al.

(10) Patent No.: US 12,488,528 B2
(45) Date of Patent: Dec. 2, 2025

(54) VERTEX INDEX ROUTING THROUGH CULLING SHADER FOR TWO LEVEL PRIMITIVE BATCH BINNING

(71) Applicant: Advanced Micro Devices, Inc., Santa Clara, CA (US)

(72) Inventors: Vishrut Vaibhav, Orlando, FL (US); Michael John Livesley, Milton Keynes (GB); Tad Robert Litwiller, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 153 days.

(21) Appl. No.: 18/193,988

(22) Filed: Mar. 31, 2023

(65) Prior Publication Data

US 2024/0169641 A1    May 23, 2024

Related U.S. Application Data

(60) Provisional application No. 63/426,574, filed on Nov. 18, 2022.

(51) Int. Cl.
*G06T 15/00* (2011.01)

(52) U.S. Cl.
CPC ........ *G06T 15/005* (2013.01); *G06T 2210/52* (2013.01)

(58) Field of Classification Search
CPC .................... G06T 15/005; G06T 2210/52
See application file for complete search history.

(56) References Cited

U.S. PATENT DOCUMENTS

| | | | |
|---|---|---|---|
| 2020/0020153 A1* | 1/2020 | Sathe | G06T 15/005 |
| 2020/0051286 A1* | 2/2020 | Nevraev | G06T 17/205 |
| 2021/0225060 A1* | 7/2021 | Tuomi | G06T 1/20 |

OTHER PUBLICATIONS

Raevenlord, "On NVIDIA's Tile-Based Rendering", downloaded from https://www.techpowerup.com/231129/on-nvidias-tile-based-rendering, on Mar. 30, 2023, 10 pgs., Mar. 1, 2017.

\* cited by examiner

*Primary Examiner* — Michelle Chin
(74) *Attorney, Agent, or Firm* — Volpe Koenig

(57) ABSTRACT

Techniques for performing rendering operations are disclosed herein. The techniques include providing indices and vertices to a culling shader; culling primitives and outputting primitives and indices that are not culled; and generating information for a fine binning pass based on the indices and primitives that are not culled.

20 Claims, 8 Drawing Sheets

VERTEX INDEX ROUTING THROUGH CULLING SHADER FOR TWO LEVEL PRIMITIVE BATCH BINNING

CROSS-REFERENCE TO RELATED APPLICATIONS

This application claims the benefit of U.S. Provisional application No. 63/426,574, filed on Nov. 18, 2022, the entirety of which is hereby incorporated herein by reference.

BACKGROUND

Hardware-accelerated three-dimensional graphics processing is a technology that has been developed for decades. In general, this technology identifies colors for screen pixels to display geometry specified in a three-dimensional coordinate space. Improvements in graphics processing technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing rendering operations are disclosed herein. The techniques include providing indices and vertices to a culling shader; culling primitives and outputting primitives and indices that are not culled; and generating information for a fine binning pass based on the indices and primitives that are not culled.

Figure 1:
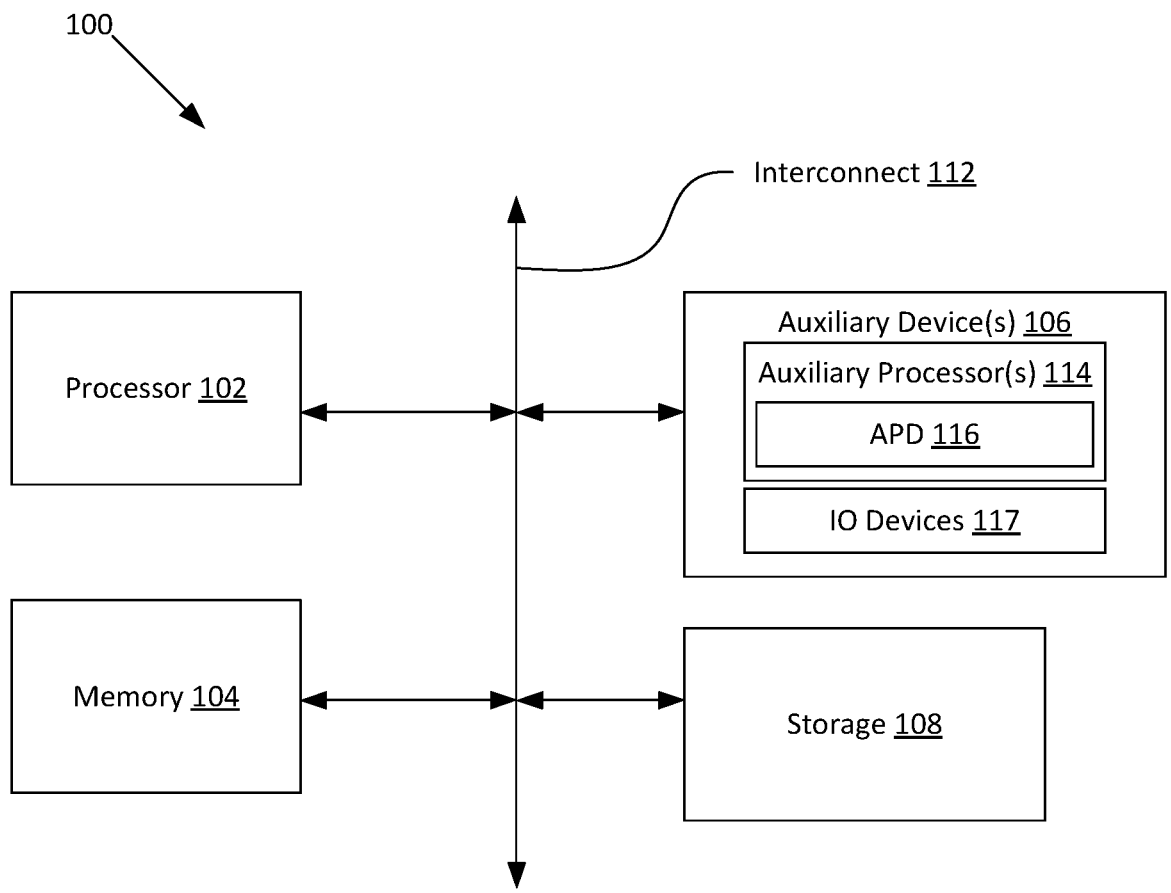
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
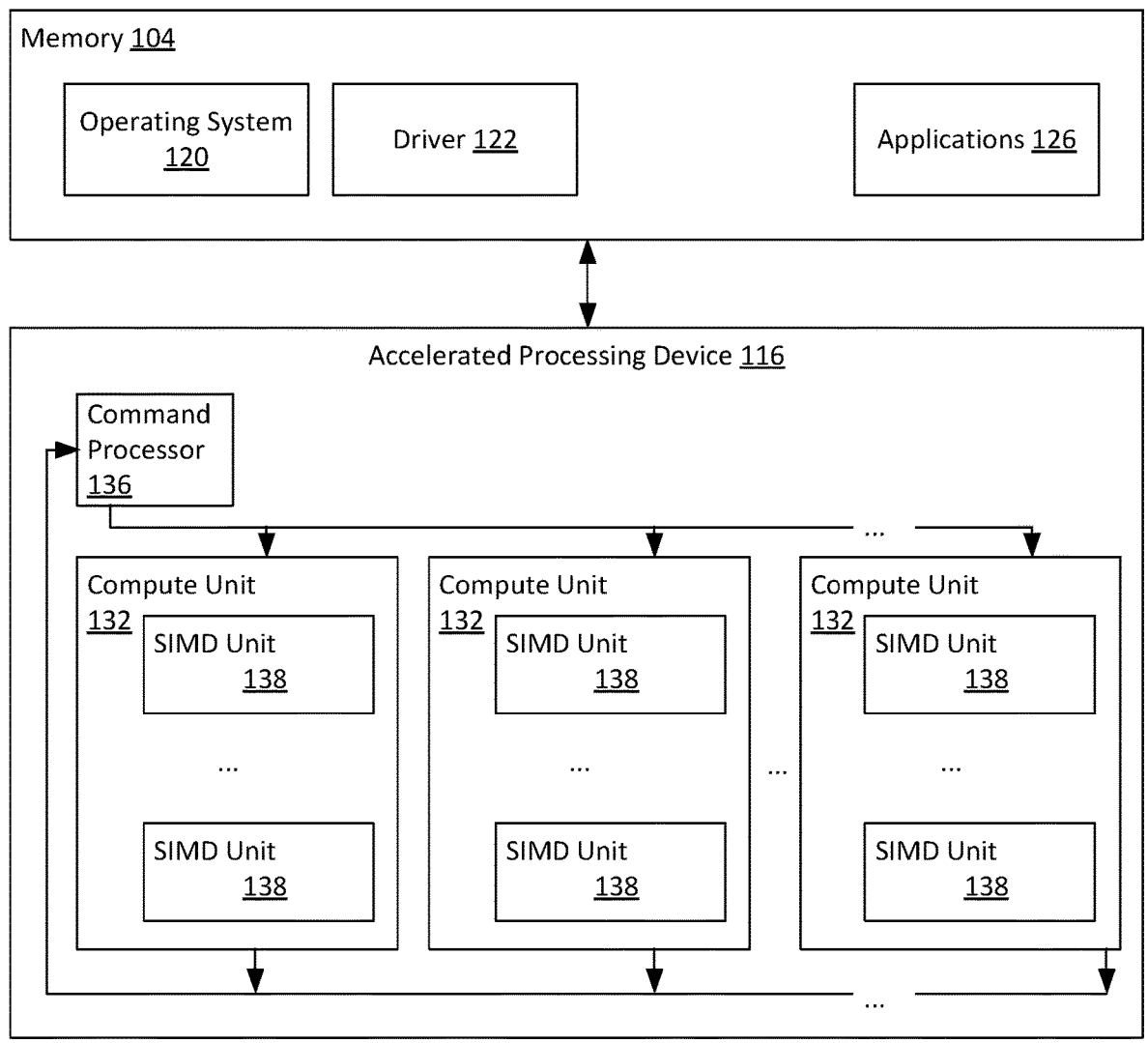
FIG. 2 illustrates details of the device of FIG. 1, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
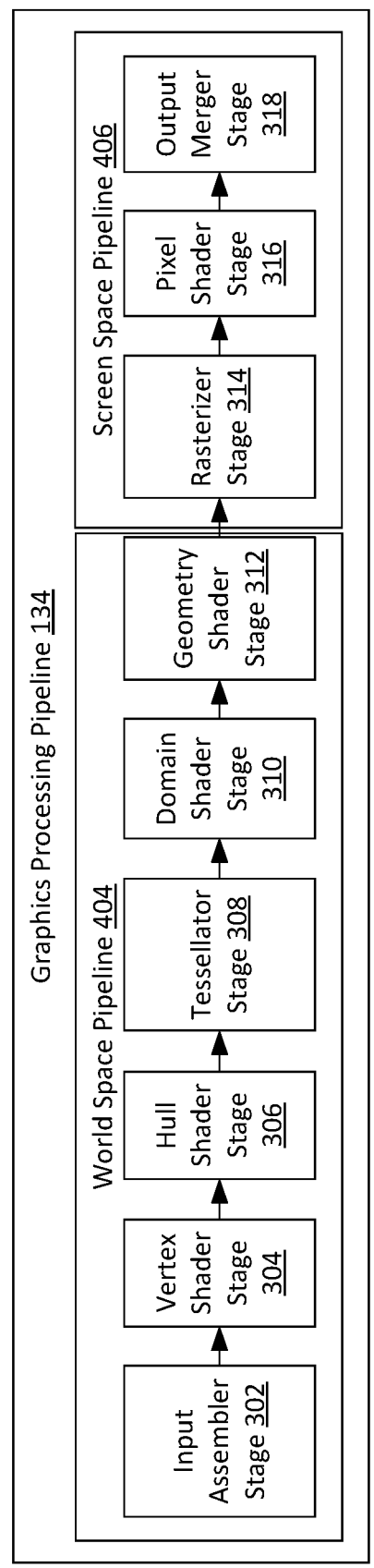
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

The graphics processing pipeline 134 is divided into a world-space pipeline 404 and a screen-space pipeline 406. The world-space pipeline 404 converts geometry in world-space into triangles in screen space. The world-space pipeline 404 includes at least the vertex shader stage 304 (which transforms the coordinates of triangles from world-space coordinates to screen-space coordinates plus depth). In some examples, the world-space pipeline 404 also includes one or more of the input assembler stage 302, the hull shader stage 306, the tessellator stage 308, the domain shader stage 310, and the geometry shader stage 312. In some examples, the world-space pipeline 404 also includes one or more other elements not illustrated or described herein. The screen-space pipeline 406 generates colors for pixels of a render target (e.g., a screen buffer for display on a screen) based on the triangles in screen space. The screen-space pipeline 406 includes at least the rasterizer stage 314, the pixel shader stage 316, and the output merger stage 318, and also, in some implementations, includes one or more other elements not illustrated or described herein.

Figure 4:
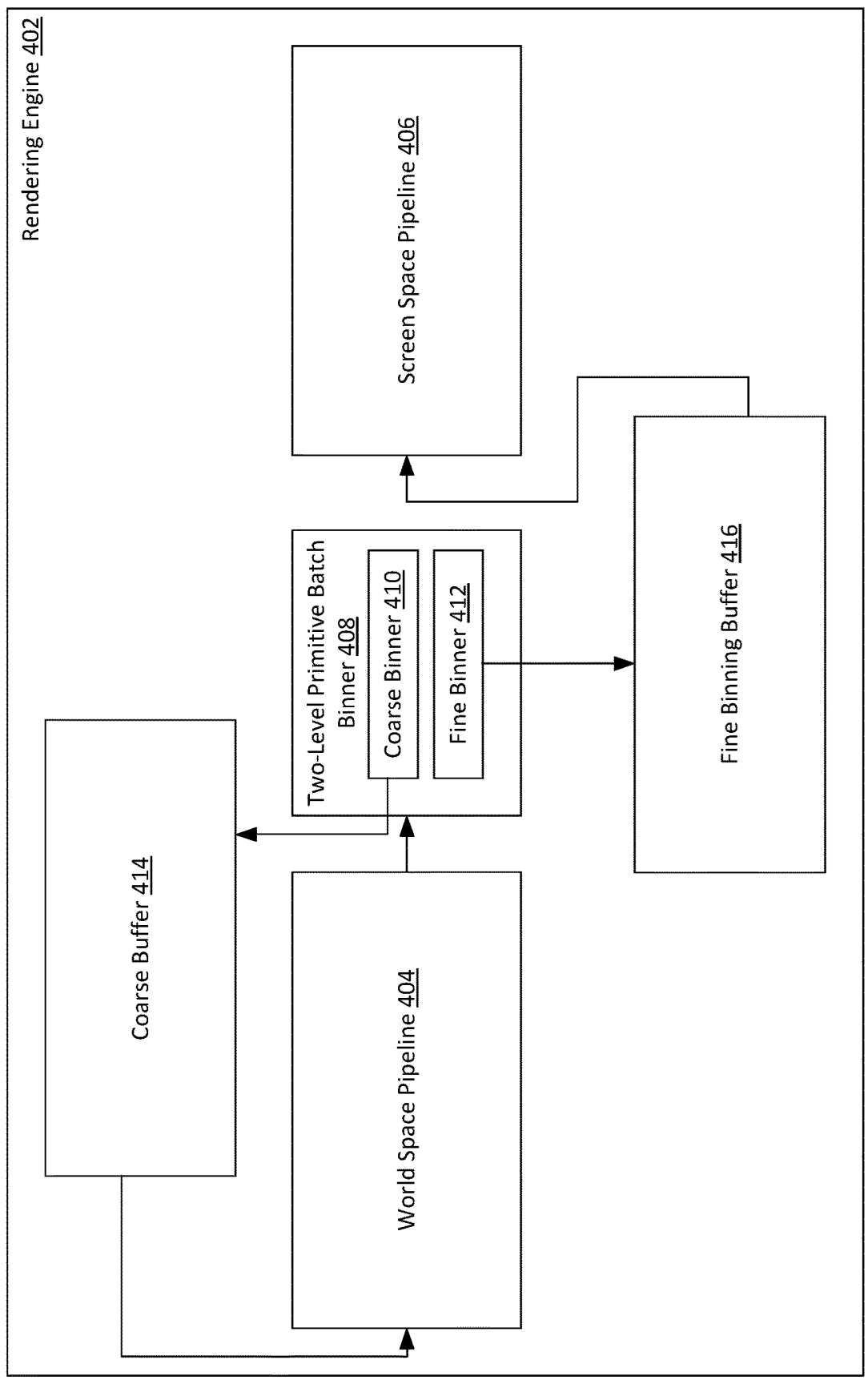
FIG. 4 illustrates additional details for the graphics processing pipeline.

FIG. 4 illustrates a rendering engine 402 that includes a two-level primitive batch binner 408, according to an example. The rendering engine 402 includes a graphics processing pipeline 134 (which includes the world-space pipeline 404 and the screen-space pipeline 406, not all of which is illustrated in FIG. 4), a two-level primitive batch binner 408, a coarse binning buffer 414, and a fine binning buffer 416. The two-level primitive batch binner 408 performs binning on two levels: a coarse level and a fine level. In general, binning means collecting geometry information into one or more buffers and "replaying" that information in tile order.

For coarse binning, ordering is performed with respect to coarse tiles and for fine binning, ordering is performed with respect to fine tiles. Replaying that information in tile order means sending the information in the buffer that overlaps a first tile to a portion of the rendering engine 402 for rendering, then sending the information in the buffer that overlaps a second tile to the portion for rendering, and so on. Binning in this manner gains benefits related to temporal and spatial cache locality. More specifically, by "reordering" work to be rendered on a tile-by-tile basis, work that requires data that is close together in memory will be performed together, meaning that accesses to memory close together will be performed close together in time, which increases the likelihood that information fetched into a cache for the rendering engine 402 will be reused before being evicted, which reduces the overall number of misses, improves performance, reduces bandwidth in accesses to external memory, and reduces power consumption as a result.

In various examples, the amount of work that is collected into the buffer is dependent on the size of the buffer, the type of work that is collected into the buffer, and the timing (e.g., relative to the frame or other timing aspect) of the work collected into the buffer. In some examples, the buffer collects geometry until the buffer is full and then replays the contents of the buffer. In some examples, the buffer replays the contents of the buffer after a different event occurs, such as the frame ending, or receiving an explicit indication to replay the contents of the buffer.

In general, two-level binning occurs in the following manner. A coarse binner 410 orders geometry output from the world space pipeline 404 into coarse bins. Each coarse bin includes geometry that overlaps a portion of screen space associated with that coarse bin. The coarse bins are larger than the fine bins for which fine binning occurs. Information associated with the geometry overlapping the coarse bins is stored in the coarse buffer 414. In some examples, this information includes The coarse buffer 414 replays the geometry to the world-space pipeline 404 in coarse bin order. The fine binner 412 stores the geometry into fine bins in the fine binning buffer 416. The fine binning buffer 416 then replays the fine bins in fine bin order. The fine bins are smaller than the coarse bins.

Because the coordinates of geometry are in world space at the beginning of the world-space pipeline 404, the first level of binning includes processing the geometry through the world-space pipeline 404 to convert such geometry into screen space. Note that in this first level of binning, in some examples, the geometry does not proceed to the screen-space pipeline 406, since the purpose of coarse binning is to increase the locality of geometry fed to the second level of binning (the fine binning). In some examples, in addition to storing, into the coarse buffer 414, information regarding which coarse bins the geometry falls within, the coarse binner 410 also stores information into the coarse buffer 414 in a manner that indicates or is associated with visibility testing performed in the world space pipeline 404. More specifically, the world-space pipeline 404 performs certain tests to determine whether geometry is visible. Such tests include backface culling, which removes triangles whose back face is facing the camera (and is thus invisible), and, optionally, other forms of culling. In some examples, the coarse binner 410 does not store information indicative of geometry into the coarse buffer 414 if that geometry is determined to be culled by the world-space pipeline 404 in the coarse binning pass. In addition, the world-space pipeline 404 performs clipping. Clipping clips portions of geometry that fall outside of the viewport. In some examples, for triangles that are clipped, the world-space pipeline 404 converts such triangles into new triangles that occupy the space of the clipped triangle.

In sum, the coarse binner 410 performs coarse binning that includes at least two operations: the coarse binner 410 categorizes geometry processed through the world-space pipeline 404 as overlapping one or more individual coarse bins; and the coarse binner 410 stores the geometry (or information indicating that geometry, such as indications of draw calls) in a way that indicates visibility information. Stated differently, in addition to organizing the coarse tiles, the coarse binner 410 may also store data in a way that indicates which triangles are culled (e.g., by culling operations of the world space pipeline 404 such as frustum culling, back-face culling, or other culling operations), such as by not storing data for triangles that have been culled.

In various examples, the coarse binner 410 stores the sorted geometry in the coarse buffer 414 as draw calls and/or as compressed data that represents the geometry of a draw call, and omits triangles that are culled. A draw call is an input to the rendering engine 402 that provides geometry such as vertices and requests rendering of that geometry. The term "call" refers to the fact that a draw call is a function in a graphics application programming interface ("API") made available to software, such as software executing on a central processing unit.

The purpose of the coarse level of binning is to enhance the ability of the fine binning operations to group together geometry. More specifically, when a coarse tile is being replayed, the coarse level tile restricts geometry sent to the fine binner 412 to a coarse tile, which increases the amount of geometry in any particular fine binning tile. By including geometry restricted to a particular area of the render target (a coarse tile), fewer fine tiles will be involved in the fine binning operations, and more geometry will be within those fine tiles. This increased "crowding" improves the benefits obtained through fine binning, since more data is involved in the cache locality enhancements of fine binning. The data is replayed in tile order so that the entire render surface is covered, but in the order of coarse tile.

Figure 5:
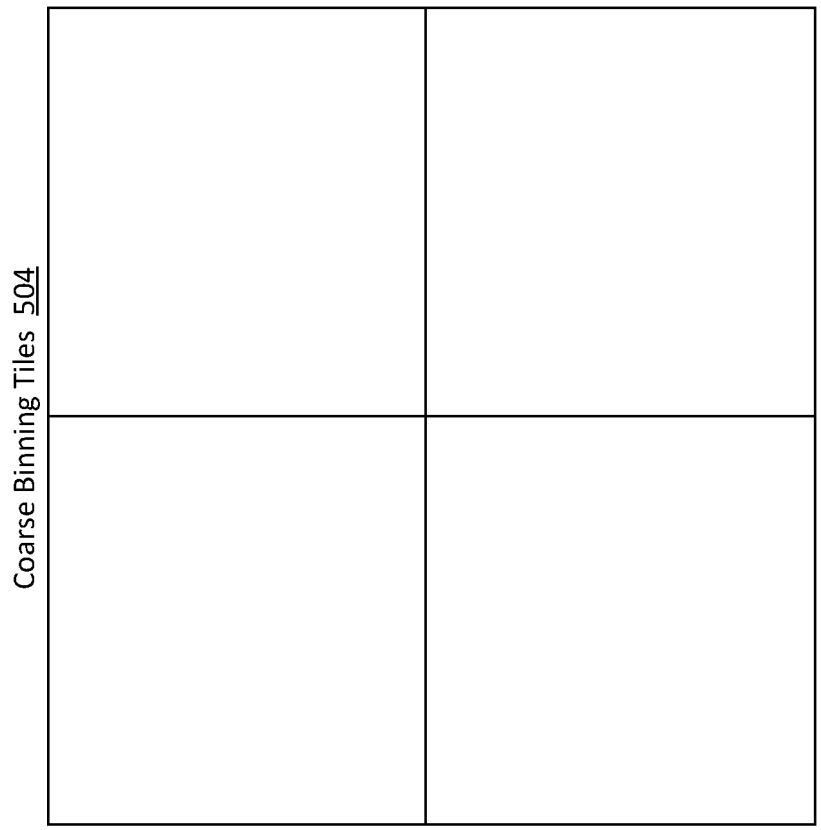
FIG. 5 illustrates screen subdivisions for binning operations.
Figure 5:
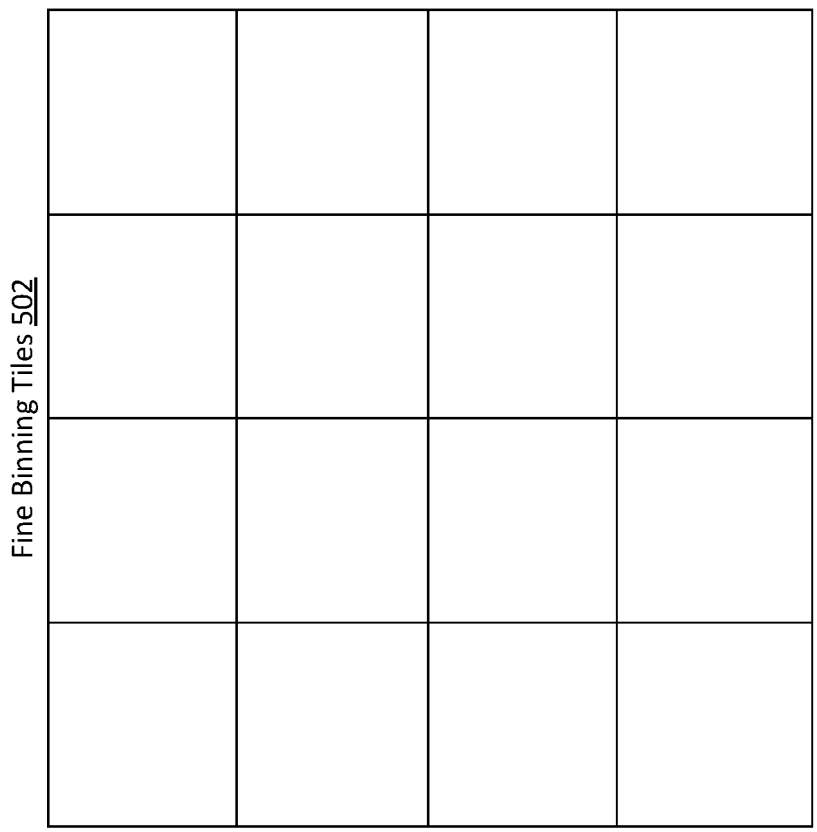

FIG. 5 illustrates fine binning tiles 502 and coarse binning tiles 504. The fine binning tiles 502 illustrate the size of the tiles that the fine binner 412 organizes geometry into. The coarse binning tiles 504 illustrate the size of the tiles that the coarse binner 410 organizes geometry into. The coarse binning tiles 504 are larger than the fine binning tiles 502.

More specifically, the coarse binning tiles 504 represent the portions of the render target that the coarse binner 410 organizes geometry into. As stated above, the coarse binner 410 sorts geometry based on which coarse tile the geometry overlaps. The coarse binning tiles 504 are the tiles upon which this sorting is based.

Similarly, the fine binning tiles 502 are the portions of the render target that the fine binner 412 organizes geometry into. The fine binner 412 sorts incoming geometry based on which fine binning tile 502 the geometry overlaps.

Figure 6:
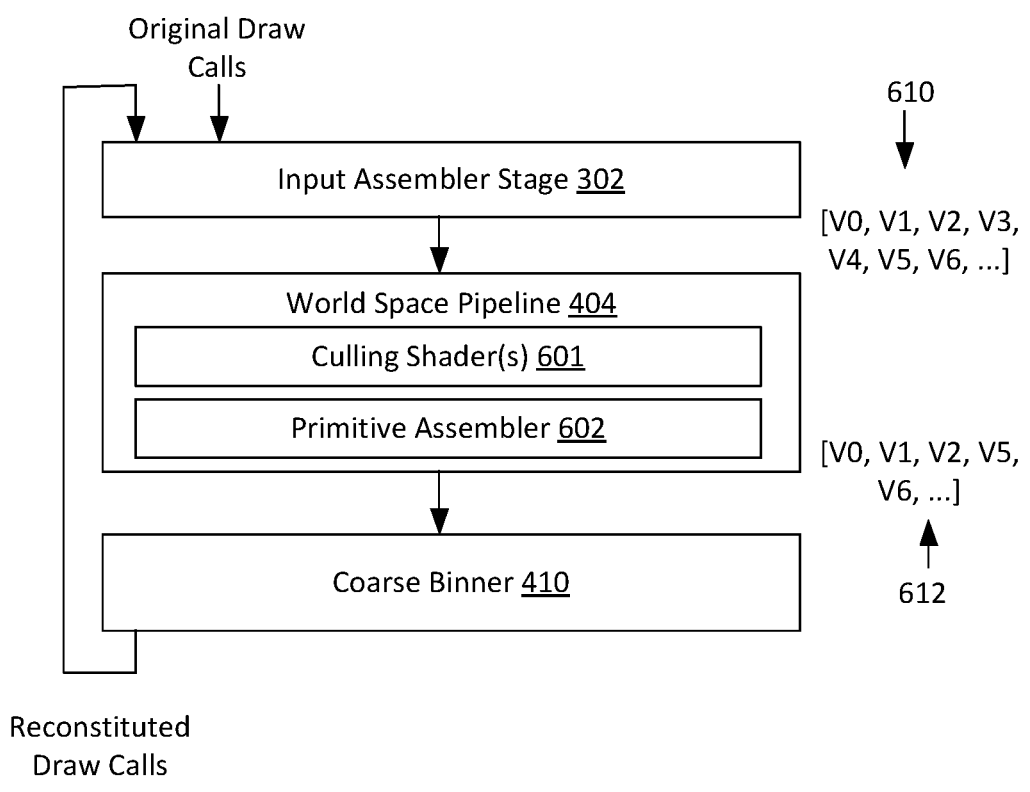
FIG. 6 illustrates a portion of the rendering engine of FIG. 4, according to an example.

FIG. 6 illustrates a portion of the rendering engine 402, according to an example. The input assembler stage 302 is illustrated independently from the remainder of the world-space pipeline 404, but could be considered part of the world-space pipeline 404. The world space pipeline 404 includes the elements described with respect to FIG. 3. In addition, the world-space pipeline 404 includes shader stages with culling capability 601 ("culling shader"). In some examples, in addition to culling, this culling shader 601 performs operations of one or more of the stages of the world-space pipeline 404 shown in FIG. 3, such as the vertex shader stage 304. The coarse binner accepts output from the world space pipeline 404, for example, as described elsewhere herein.

In greater detail, the input assembler stage 302 accepts draw calls (e.g., from the processor 102 via the command processor 136). The draw calls specify geometry to render. The draw calls include triangles or other geometry defined by vertex indices. A vertex index is a reference to vertex data such as coordinates and/or other data. Each vertex index is a reference to an item of data for one vertex stored in a buffer. Draw calls specify geometry by vertex indices, rather than including the full vertices within the draw calls, to reduce the size of the draw calls and to avoid duplication of vertex data. In an example, a vertex index is specified with a single value (e.g., 32 bit or 64 bit value) while vertex data includes multiple coordinates, each specified with three values. Thus including an index rather than a vertex in a draw call allows the draw calls to be smaller.

In the example illustrated in FIG. 6, in the course of processing the draw calls, the world-space pipeline 404 obtains the vertex data based on the provided indices, but does not maintain the original indices. A primitive assembler 602 (which, in some examples, is also a shader program, and in some examples, is integrated with the culling shader 601, and in other examples, is fixed function hardware) collects vertex data into primitives and provides those primitives to the coarse binner 410. The primitive assembler 602 outputs the processed primitives, with culled triangles being removed, to the coarse binner 410.

In addition to other operations of the world-space pipeline 404, the culling shader 601 performs culling operations. The culling operations include culling primitives from a stream of primitives received by the culling shader 601. The culling shader 601 applies any of a variety of techniques such as frustum culling, which includes discarding primitives outside of the view frustum (the portion of the volume that is in front of the camera and considered to be viewable).

The coarse binner 410 generates "reconstituted" draw calls from the geometry output by the culling shader(s) 601 and/or primitive assembler 602. Reconstituted draw calls are draw calls that are sorted in coarse bin order. These draw calls are "reconstituted" because the draw calls differ from the draw calls originally provided to the rendering engine 402 before coarse binning occurs. In other words, an entity such as the processor 102 provides draw calls to the rendering engine 402. The rendering engine 402 processes the draw calls through the input assembler stage 302, world space pipeline 404, and coarse binner 410, and generates the "reconstituted draw calls" for a second pass. The second pass is a fine binning pass in which the geometry of the reconstituted draw calls is processed through the world-space pipeline 404, sorted through the fine binner 412, and processed in the screen-space pipeline 406 (FIG. 4).

The reconstituted draw calls include "coarse bin sets." Each coarse bin set is a set of draw calls whose primitives overlap a particular coarse binning tile 504. To generate a coarse bin set for a particular coarse binning tile 504, the coarse binner 410 includes the draw calls, of the draw calls originally input to the input assembler stage 302, which have at least one primitive that overlaps that coarse binning tile 504. If a draw call has no such primitives, then the coarse binner 410 does not include that draw call for that coarse binning tile. In addition, for draw calls that do include primitives that overlap a coarse binning tile 504, the coarse binner 410 removes primitives from those draw calls that do not overlap the coarse binning tile 504. Thus each coarse bin set includes the draw calls that include primitives that overlap the coarse binning tile 504 of that coarse binning set.

Any particular draw call input to the input assembler stage 302 can be output multiple times, once for each coarse bin overlapped by that draw call (i.e., once for each draw call that has a primitive that is not culled and that overlaps that coarse bin). Thus, for each coarse bin, the coarse binner 410 outputs all of the draw calls input to the input assembler stage 302, except for those draw calls that do not have any primitives that overlap the coarse bin. Further, the coarse binner 410 removes primitives from output draw calls that do not overlap the coarse bin, and also does not include culled primitives. The coarse binner 410 may otherwise modify such draw calls, such as by compressing the draw calls.

In order to generate the reconstituted draw calls, the coarse binner 410 requires the vertex indices from the original draw calls. In other words, as described above, although the graphics processing pipeline 134 receives draw calls, which specify indices, other portions of the pipeline requires vertex data, and not index data. Thus, such other portions do not necessarily receive the indices. However, reconstituted draw calls require indices. Thus, these indices must be provided by the input assembler stage 302 to the coarse binner 410 in some manner. In modes of operation where a culling shader 601 is not used, it is possible for the input assembler stage 302 to provide such indices to the coarse binner 410 (e.g., directly or via another unit such as the primitive assembler 602). More specifically, in some such examples, a fixed-function primitive assembler 602 receives indices from the input assembler stage 302. The primitive assembler 602 itself is able to correlate these indices with the vertices that are output as a result of culling operations and is thus able to correlate the indices from the input assembler stage 302 with the vertices output from the primitive assembler 602 in a manner that allows the coarse binner 410 to generate the reconstituted draw calls.

In other examples, the input assembler stage 302 provides the indices to coarse binner 410, bypassing the world-space pipeline 404 entirely. In that situation, the primitive assembler 602 performs culling and thus does not provide all vertices processed to the coarse binner 410. However, the primitive assembler 602 does provide vertices to the coarse binner 410 in a manner that indicates how to correlate such vertices to the indices received by the coarse binner 410 from the input assembler stage 302. More specifically, where vertices are culled, the primitive assembler 602 provides placeholder vertices that have any sort of data, such as valid or invalid vertex data. These placeholder vertices ensure that the order of vertices output by the primitive assembler 602 is the same as the order of indices received by the coarse binner 410, thereby allowing the coarse binner 410 to generate reconstituted draw calls including indices. For example, the coarse binner correlates determines which vertices were culled, correlates such vertices to indices, and generates the reconstituted draw calls as appropriate given which vertices were culled.

In some examples, a culling shader 601 with capabilities of the primitive assembler 602 is used, and vertices are output from such shader using placeholder vertices as described above. In such instances, the coarse binner 410 is able to correlate vertices output by the primitive assembler 602 to indices received from the input assembler stage 302. However, in some examples, a culling shader 601 performs compaction on the received vertices in conjunction with performing culling. More specifically, as illustrated in FIG. 6, a culling shader 601 receives a set of vertices 610. The culling shader culls primitives represented by those vertices and outputs a compacted set of output vertices 612. The output vertices 612 are compacted in that there are no placeholder vertices for vertices that are part of culled primitives. In other words, the culling shader 601 culls primitives and removes the vertices for those primitives from the output of the culling shader 601. In this situation, the coarse binner 410 is unable to correlate the vertices received from the culling shader 601 with indices from the input assembler stage 302 without additional information. More specifically, it is not possible to determine which index is associated with a particular vertex in the output vertices 612 because the order of vertices in the output vertices 612 has changed when compaction occurs. For this reason, the present disclosure provides techniques to support generation of reconstituted draw calls in the situation that a culling shader 601 culls primitives and outputs associated vertices in a compacted form.

Figure 7:
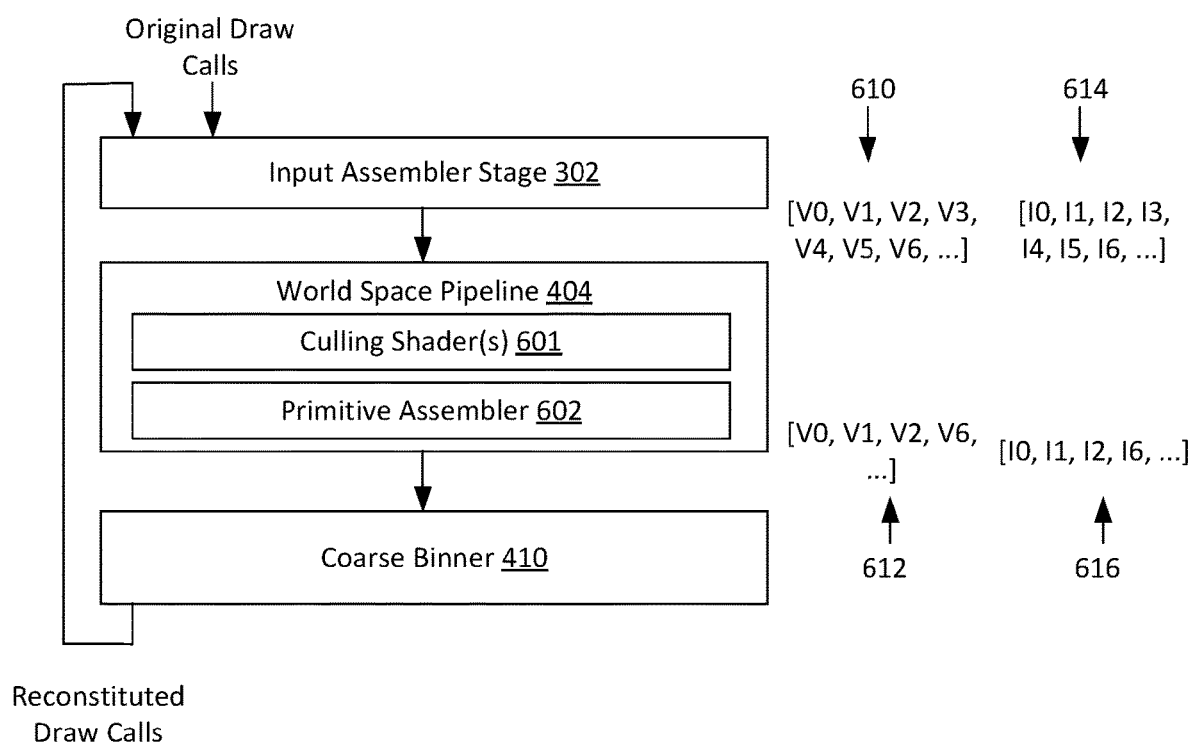
FIG. 7 illustrates a portion of the rendering engine of FIG. 4, according to another example.

FIG. 7 illustrates a technique for facilitating generation of reconstituted draw calls in conjunction with using a culling shader 601, according to an example. In the technique of FIG. 7, the culling shader 601 accepts the indices 614 from the input assembler stage 302 along with the vertices. The culling shader 601 culls primitives, resulting in a determination that the vertices associated with those primitives should not be exported to the coarse binner 410 to generate reconstituted draw calls. As a result of this determination, the culling shader 601 emits a set of vertices and a set of indices. In this output, each vertex is correlated to a corresponding index. For culling, the culling shader 601 eliminates vertices and corresponding indices from the input vertices 610 and input indices 614, such that the output from the culling shader 601 is a set of non-culled vertices 612 and a set of non-culled indices 616. In other words, the culling shader 601 inputs and outputs both vertices and indices. Moreover, the order of the output indices and the order of the output vertices is correlated. In other words, the order of the indices and vertices output is the same, with both vertices and indices corresponding to culled primitives removed from that order. In the example of FIG. 7, an input list of vertices 610 includes vertices V0 through V6 and an input list of indices 614 includes indices 10 through 16. A primitive having vertices V3, V4, and V5 is culled and thus those vertices are eliminated from the output list of vertices 612. Indices 13, 14, and 15 correspond to vertices V3, V4, and V5, and thus the output list of indices 616 does not include indices 13, 14, and 15. The relative order of the other indices and vertices is the same in the input and output lists of indices and vertices, allowing the coarse binner 410 to obtain the correct indices for the reconstituted draw calls. In other words, the coarse binner 410 obtains the indices associated with the non-culled vertices from the culling shader 601, which outputs those indices. The coarse binner 410 generates the reconstituted draw calls to include these indices.

The scheme of FIG. 7 is in contrast with another scheme (e.g., FIG. 6), in which the culling shader 601 does not receive indices, but does receive vertices. In the scheme of FIG. 6, the indices are not provided to the culling shader 601. The culling shader 601 receives vertices, which specify geometric aspects of primitives such as triangles. The culling shader 601 in FIG. 6 culls certain primitives. If the culling shader 601 compacts the output vertices, meaning the culling shader in FIG. 6 does not output placeholder vertices for culled vertices, then the coarse binner 410 is unable to determine which indices correspond to the remaining vertices and is unable to generate the reconstituted draw calls. In FIG. 7, however, by providing indices to the culling shader 601, the culling shader 601 is able to provide the indices associated with non-culled vertices to the coarse binner 410 and to omit the indices associated with culled vertices to the coarse binner 410, which allows the coarse binner to generate the reconstituted draw calls using those indices.

Generating the reconstituted draw calls using these indices includes generating draw calls as described above (e.g., with respect to FIG. 6). In the course of generating these reconstituted draw calls, the coarse binner 410 includes the indices that have not been culled and does not include the indices that have been culled. The coarse binner 410 orders these indices based on coarse binning tiles 504, as described elsewhere herein.

In some examples, the rendering engine 402 is capable of operating in a mode in which fixed function hardware, rather than the culling shader 601, performs culling operations. In such examples, the primitive assembler 602 performs the culling operations that would be performed by the culling shader 601. In some such examples, the input assembler stage 302 provides indices to the coarse binner 410 directly, for generation of the reconstituted draw calls, bypassing the world-space pipeline 404. In other such examples, the input assembler stage 302 provides indices to the primitive assembler 602. The primitive assembler 602 correlates the provided indices with non-culled vertices and provides such vertices and indices to the coarse binner to generate the reconstituted draw calls.

In some examples, a rendering engine 402 is capable of operating in a first mode in which a culling shader 601 performs culling and a second mode in which a fixed function unit such as a primitive assembler 602 performs culling, and no culling shader 601 is executed. In such examples, in the first mode, the input assembler stage 302 provides the indices to the world-space pipeline 404, which passes such indices through to the culling shader 601 as described above. In the second mode, the input assembler stage 302 provides the indices to the primitive assembler 602 or directly to the coarse binner 410, bypassing some or all of the world space pipeline 404.

Figure 8:
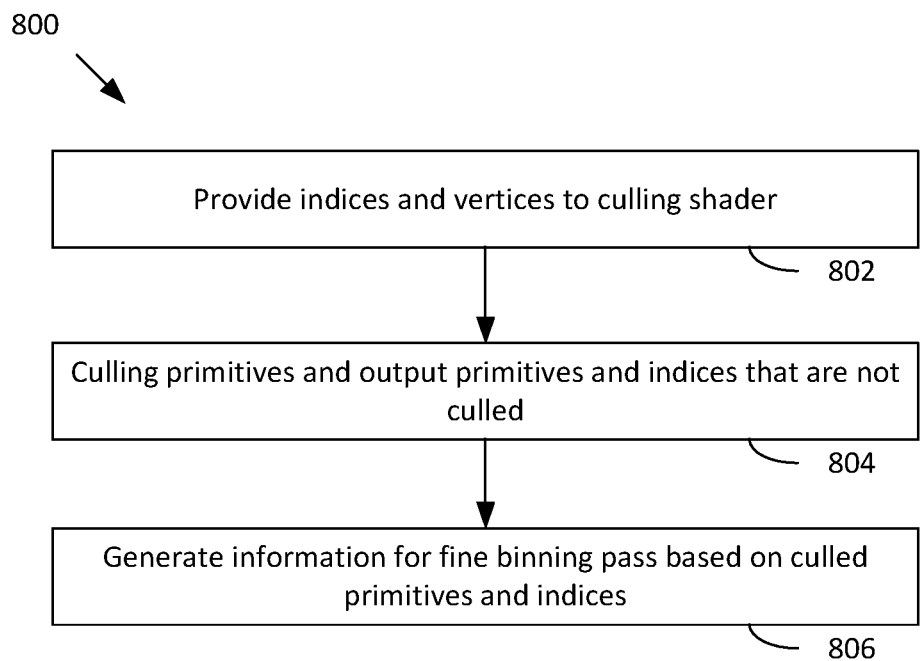
FIG. 8 is a flow diagram of a method for rendering geometry.

FIG. 8 illustrates a method 800 for rendering geometry, according to an example. Although described with respect to the system of FIGS. 1-7, those of skill in the art will understand that any system configured to perform the steps of the method 800 in any technically feasible order falls within the scope of the present disclosure.

At step 802, a world-space pipeline 404 provides vertices and indices to a culling shader 601. The vertices and indices originate from draw calls provided to the input assembler stage 302. The world-space pipeline 404 processes the vertices, for example, by performing vertex transforms or other operations, and provides those vertices to the culling shader 601. The culling shader 601 also obtains the indices associated with the vertices.

At step 804, the culling shader 601 culls primitives from the vertex stream. Any technically feasible culling technique can be used. Such culling removes vertices from the input vertices. The culling shader 601 outputs the vertices received at the culling shader 601, without the vertices that are culled, and also outputs indices associated with the output vertices, without the indices corresponding to the vertices that are culled. Thus the information that is output from the culling shader 601 includes non-culled vertices and indices that correspond to those non-culled vertices, but does not include the culled vertices or indices that correspond to those culled vertices.

At step 806, a coarse binner 410 generates information for a fine binning pass based on the culled primitives and indices received from the culling shader 601. In some examples, generating this information includes generating information that would allow the primitives that were not culled to be rendered in a fine binning pass. In some examples, the information is a set of draw calls that are processed again by the rendering engine 402, e.g., by processing the information through the world-space pipeline 404 (e.g., through a vertex shader), then through the fine binner 412, and then through the screen-space pipeline 406 to generate pixels.

As stated above, the culling shader 601 culls or removes vertices, compacting the results. In other words, the culling shader 601 does not include placeholder vertices where culled vertices are. Due to this compaction, the coarse binner 410 would not be able to correlate the stream of vertices output from the culling shader 601 with indices to be used in the reconstituted draw calls. Thus, the culling shader 601 also outputs, for each vertex output by the culling shader 601, a corresponding index that corresponds to that vertex. This information is output to the coarse binner 410. The coarse binner is thus able to generate the reconstituted draw calls, omitting the culled vertices and indices, and including the non-culled vertices and indices. Put simply, the culling shader 601 imports indices corresponding to vertices, culls at least some of the vertices, and exports indices corresponding to the vertices that were not culled, and does not export the indices corresponding to the vertices that were culled.

The various functional units illustrated in the figures and/or described herein (including, but not limited to, the processor 102, the auxiliary devices 106, auxiliary processors 114, the APD 116, the 10 devices 117, the command processor 136, the graphics processing pipeline 134, the compute units 132, the SIMD units 138, each stage of the graphics processing pipeline 134 illustrated in FIG. 3, or the elements of the rendering engines 402, including the coarse buffer 414, fine binning buffer 416, two-level primitive batch binner 408, coarse binner 410 (and units therein), screen-space pipeline 406, fine binner 412, and fine binning buffer 416, may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering, comprising:
in a culling shader, culling input primitives to generate first primitives;
compacting indices and vertices of the first primitives by removing indices and vertices that are not in the first primitives to generate compaction output;
outputting the compaction output to a binner in an order in which indices in the compaction output and vertices in the compaction output are in matching order; and
performing a fine binning pass based on the compaction output.

2. The method of claim 1, wherein the culling shader comprises a shader program.

3. The method of claim 1, wherein the culling shader is configured to import the indices and vertices.

4. The method of claim 1, wherein the compaction output does not include the indices and vertices that are not culled.

5. The method of claim 1, wherein generating the information comprises generating draw calls to render the primitives that are not culled.

6. The method of claim 1, further comprising processing the vertices through a world-space pipeline.

7. The method of claim 6, further comprising, in the fine binning pass, processing output from the world-space pipeline in a screen-space pipeline.

8. The method of claim 1, wherein generating the information includes generating draw calls that do not include indices for removed primitives.

9. A device, comprising:
a coarse binner circuit; and
a processor configured to execute a culling shader, the culling shader configured to:
cull input primitives to generate first primitives;
compact indices and vertices of the first primitives by removing indices and vertices that are not in the first primitives to generate compaction output;
output the compaction output to the coarse binner circuit in an order in which indices in the compaction output and vertices in the compaction output are in matching order the coarse binner circuit is configured to perform a fine binning pass based on the compaction output.

10. The device of claim 9, wherein the culling shader comprises a shader program.

11. The device of claim 9, wherein the culling shader is configured to import the indices and vertices.

12. The device of claim 9, wherein the compaction output does not include the indices and vertices that are not culled.

13. The device of claim 9, wherein generating the information comprises generating draw calls to render the primitives that are not culled.

14. The device of claim 9, further comprising a world-space pipeline configured to process the vertices.

15. The device of claim 14, further comprising a screen-space pipeline configured to process output from the world-space pipeline in a fine binning pass.

16. The device of claim 9, wherein generating the information includes generating draw calls that do not include indices for removed primitives.

17. A non-transitory computer-readable medium storing instructions that, when executed by a processor, cause the processor to perform operations comprising:
in a culling shader, culling input primitives to generate first primitives;
compacting indices and vertices of the first primitives by removing indices and vertices that are not in the first primitives to generate compaction output;
outputting the compaction output to a binner in an order in which indices in the compaction output and vertices in the compaction output are in matching order; and
performing a fine binning pass based on the compaction output.

18. The non-transitory computer-readable medium of claim 17, wherein the culling shader comprises a shader program.

19. The non-transitory computer-readable medium of claim 17, wherein the culling shader is configured to import the indices and vertices.

20. The non-transitory computer-readable medium of claim 17, wherein the compaction output does not include the indices and vertices that are not culled.

* * * * *